United States Patent [19]

Vogel et al.

[11] 4,212,802
[45] Jul. 15, 1980

[54] 1:2 CHROMIUM COMPLEXES OF DISAZO COMPOUNDS

[75] Inventors: Claude Vogel, St.-Louis, France; Heinz Wicki, Basel, Switzerland

[73] Assignee: Sandoz Ltd., Basel, Switzerland

[21] Appl. No.: 930,085

[22] Filed: Aug. 1, 1978

[30] Foreign Application Priority Data

Aug. 5, 1977 [CH] Switzerland .......................... 9634/77
Feb. 21, 1978 [CH] Switzerland .......................... 1843/78

[51] Int. Cl.² ............................................ C09B 45/26
[52] U.S. Cl. ............................. 260/145 A; 260/148; 260/145 B; 260/146 R
[58] Field of Search .............. 260/145 A, 148, 145 B, 260/146 R

[56] References Cited

U.S. PATENT DOCUMENTS

| | | | |
|---|---|---|---|
| 2,897,190 | 7/1959 | Fasciati | 260/145 A |
| 3,005,813 | 10/1961 | Brassel et al. | 260/145 A |
| 3,625,935 | 12/1971 | Back et al. | 260/145 A |
| 3,759,892 | 9/1973 | Wicki | 260/148 X |
| 4,123,428 | 10/1978 | Holliger et al. | 260/148 X |

FOREIGN PATENT DOCUMENTS

| | | | |
|---|---|---|---|
| 2722855 | 12/1977 | Fed. Rep. of Germany | 260/145 A |
| 666337 | 2/1952 | United Kingdom | 260/145 A |
| 1053928 | 1/1967 | United Kingdom | 260/148 |
| 1118174 | 6/1968 | United Kingdom | 260/145 A |

*Primary Examiner*—Arthur P. Demers
*Attorney, Agent, or Firm*—Gerald D. Sharkin; Richard E. Vila; Melvyn M. Kassenoff

[57] ABSTRACT

Complexes of the formula

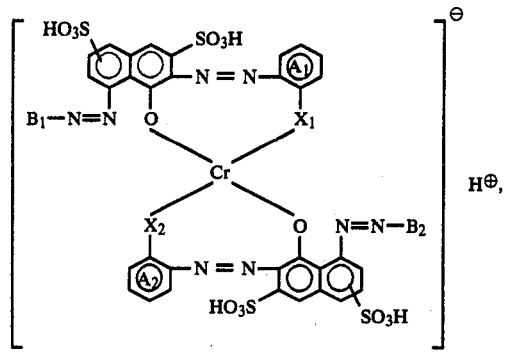

in which
each of $X_1$ and $X_2$, independently, is —COO— or —O—,
each of $B_1$ and $B_2$, independently, is the radical of a coupling component of the benzene series containing up to two non-condensed benzene rings or a radical of a coupling component of the quinoline series, which coupling component radicals are free from acid groups,
each of

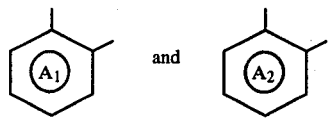

independently, is the radical of a diazo component of the benzene series in which the rings $A_1$ and $A_2$ shown are free from acid groups bound directly thereto,
each of the floating sulpho groups on the naphthalene rings, independently, is in the 3- or 4-position, which complexes are free from fibre reactive groups and are in free acid or salt form, and mixtures of such complexes are useful as anionic dyestuffs for substrates comprising or consisting of, for example, natural or regenerated cellulose, natural or synthetic polyamides, leather, polyurethanes or polymers modified to contain basic groups.

21 Claims, No Drawings

1:2 CHROMIUM COMPLEXES OF DISAZO COMPOUNDS

The present invention relates to 1:2 chromium complexes of disazo compounds, their production and use as anionic dyestuffs.

Accordingly, the present invention provides 1:2 chromium complexes of disazo compounds of formula 1

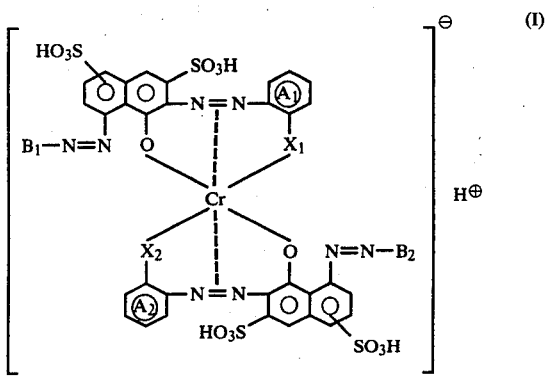

in which
each of $X_1$ and $X_2$, independently, is —COO— or —O—,
each of $B_1$ and $B_2$, independently, is a radical of a coupling component of the benzene series containing up to two non-condensed phenyl rings or a radical of a coupling component of the quinoline series, which coupling component radicals are free from acid groups,
each of

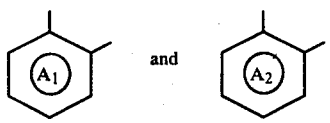

independently, is a radical of a diazo component of the benzene series in which the rings $A_1$ and $A_2$ shown are free from acid groups bound directly thereto,
each of the floating sulpho groups on the naphthalene components, independently, is in the 3- or 4-position, which complexes are free from fibre reactive groups and are in free acid or salt form, and mixtures of such complexes.

It will be appreciated that the coupling component radicals $B_1$ and $B_2$ must bear one or more substituents which activate coupling for example, hydroxy and primary, secondary and tertiary amino groups (preferably only one hydroxy group). Preferred amino groups are —$NH_2$ and phenylamino in which the phenyl nucleus is optionally substituted by $(C_{1-4})$alkyl. Preferably, the coupling component radicals bear not more than two such activating groups. In addition to such activating substituents it will be appreciated that the coupling component radicals may be further substituted by substituents common for coupling components in anionic disazo dyes. Preferably, each of the coupling component radicals, independently, is optionally further substituted by an alkyl (preferably $C_{1-4}$) or alkoxy (preferably $(C_{1-4})$) group or by a halogen atom. Preferably, each of $B_1$ and $B_2$ is independently 8-hydroxyquinolyl or substituted phenyl having one or two substituents selected from hydroxy, —$NH_2$, phenylamino (anilino) and $(C_{1-4})$alkylphenylamino, with the proviso that not more than one substituent is selected from phenylamino and $(C_{1-4})$alkylphenylamino, and, optionally, one further substituent selected from halo, $(C_{1-4})$alkyl and $(C_{1-4})$alkoxy. More preferably, when any of $B_1$ and $B_2$ is substituted phenyl, it has one or two substituents selected from —$NH_2$ and hydroxy (maximum of one hydroxy) and, optionally, one further substituent selected from halo, $(C_{1-4})$alkyl and $(C_{1-4})$alkoxy.

It will be appreciated that the rings $A_1$ and $A_2$ may bear substituents which are common for diazo components of the benzene series. Preferably, each of rings $A_1$ and $A_2$, independently, is unsubstituted or substituted by up to two substituents selected from the group consisting of halogen, nitro, $(C_{1-4})$alkyl, $(C_{1-4})$alkoxy and —$SO_2NR_1R_2$ (at most one —$SO_2NR_1R_2$ group), in which $R_1$ is hydrogen or $(C_{1-4})$alkyl, and $R_2$ is hydrogen, $(C_{1-4})$alkyl or

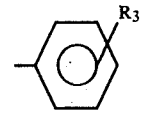

wherein $R_3$ is hydrogen, halogen, $(C_{1-4})$alkyl, $(C_{1-4})$alkoxy or —COOH. Preferably, the ring $A_1$ and/or $A_2$ bears a maximum of one halogen atom and/or a maximum of one group selected from $(C_{1-4})$alkyl and $(C_{1-4})$alkoxy.

By halogen as used herein is meant chlorine, bromine, fluorine or iodine.

Any alkyl or alkoxy group on rings $A_1$ and/or $A_2$ or on the coupling component radicals $B_1$ and/or $B_2$ preferably contains 1 or 2 carbon atoms with methyl and methoxy being especially preferred.

Any halogen on rings $A_1$ and/or $A_2$ or on the coupling component radicals $B_1$ and/or $B_2$ is preferably chlorine or bromine, especially chlorine.

$R_1$ is preferably $R_1'$, where $R_1'$ is hydrogen or methyl, more preferably hydrogen.

$R_3$ is preferably $R_3'$, where $R_3'$ is hydrogen, chlorine, methyl, methoxy or carboxy, more preferably $R_3$ is $R_3''$, where $R_3''$ is hydrogen or carboxy.

$R_2$ is preferably $R_2'$, where $R_2'$ is hydrogen, methyl or

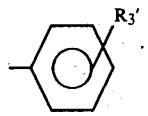

More preferably $R_2$ is $R_2''$, where $R_2''$ is methyl or

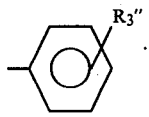

Preferably, each of the radicals

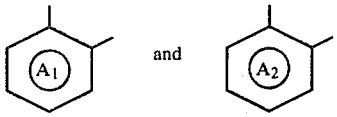

independently, is a radical of formula $A_x$,

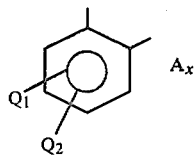

in which
$Q_1$ is hydrogen or nitro, and
$Q_2$ is hydrogen, chlorine, nitro or $-SO_2-NR_1R_2$, more preferably
$Q_2$ is hydrogen, chlorine, nitro or $SO_2NR_1'R_2'$.
Preferably, $Q_1$ is hydrogen when $Q_2$ is $-SO_2NR_1R_2$. More preferably, each of the radicals

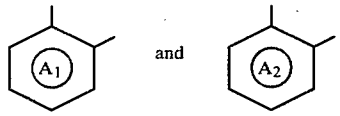

independently, is a radical of formula $A_x'$ in which $A_x'$ is a group of formula $A_x$ wherein $Q_2$ is chlorine, nitro or $-SO_2NR_1'R_2'$, more preferably chlorine, nitro or $-SO_2NHR_2''$, with the proviso that where $Q_2$ is an aminosulphonyl group $Q_1$ is hydrogen.

Preferably, each of the coupling component radicals $B_1$ and $B_2$, independently, is of formula (a), (b) or (c)

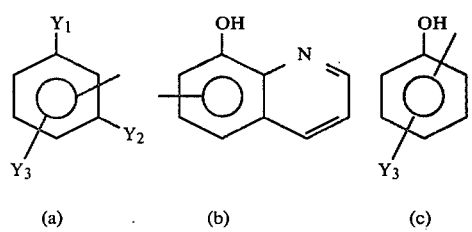

in which
$Y_1$ is $-NH_2$ or $-OH$,
$Y_2$ is $-NH_2$ or

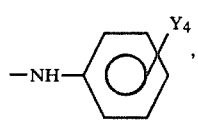

$Y_3$ is hydrogen, $(C_{1-4})$alkyl, $(C_{1-4})$alkoxy or chlorine, wherein when $Y_3$ is other than hydrogen, it is in a position ortho or para to $Y_1$, and $Y_4$ is hydrogen or $(C_{1-4})$alkyl.
When
$Y_2$ is

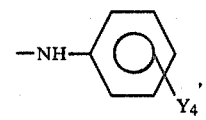

$Y_1$ is preferably hydroxy and $Y_3$ is preferably hydrogen. The substituent $Y_4$ may be in any position but is preferably in the 2- or 4-position, with the 2-position being most preferred.
$Y_3$ is preferably hydrogen or $(C_{1-4})$alkyl, especially hydrogen or methyl.
More preferably (a) is (a'),

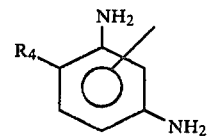

(a')

in which $R_4$ is hydrogen or methyl.
Of the coupling component radicals of formulae (a), (b) and (c), those of formulae (a) and (b) are preferred, with those of formula (a'), especially those of formula (a') where $R_4$ is hydrogen, being most preferred.
The floating sulpho group on each of the the naphthalene nuclei is preferably bound to the 3-position.
Each of $X_1$ and $X_2$ is preferably $-O-$.
Preferred complexes of formula I are those in which each of the rings $A_1$ and $A_2$, independently, is unsubstituted or substituted by a total of up to two substituents selected from the group consisting of halogen, nitro, $(C_{1-4})$alkyl, $(C_{1-4})$alkoxy and $-SO_2NR_1R_2$ (at most one $-SO_2NR_1R_2$ group), and each of the coupling component radicals $B_1$ and $B_2$, independently, is a radical of formula (a), (b) or (c), preferably (a) or (b) and especially (a'). Of these preferred complexes, those wherein each of $X_1$ and $X_2$ is $-O-$ are preferred, with those wherein $X_1$ and $X_2$ are both $-O-$ and the floating sulpho groups are in the 3-positions of the naphthalene nuclei being particularly preferred.
Of these preferred complexes, those wherein each of the rings $A_1$ and $A_2$, independently, is unsubstituted or substituted by a total of up to two substituents selected from the group consisting of nitro, $-SO_2NR_1R_2$ (a maximum of one $-SO_2NR_1R_2$ group), halogen atoms (a maximum of one halogen atom), $(C_{1-4})$alkyl and $(C_{1-4})$alkoxy (a maximum of either one alkyl or one alkoxy group) and preferably, when any of the rings $A_1$ and $A_2$ bears a $-SO_2NR_1R_2$ group, such ring bears no further substituent, with those compounds where each of $B_1$ and $B_2$, independently, is a radical of formula (a) or (b), especially (a), being most preferred.
More preferred complexes of formula I are those of formula I',

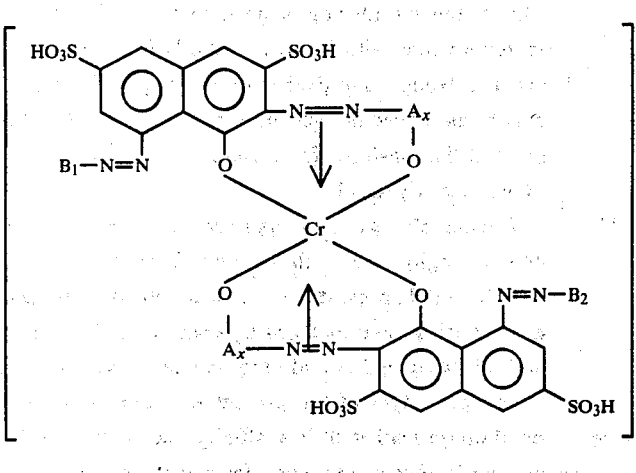 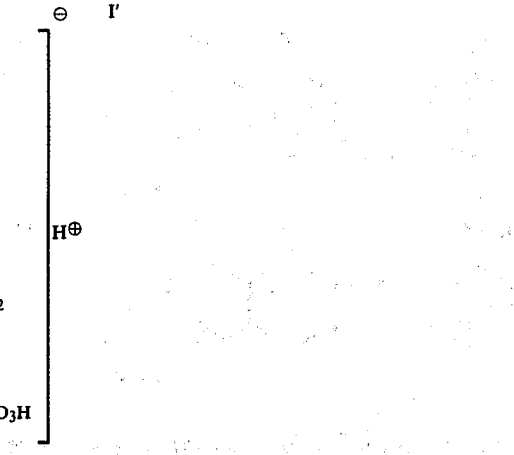

in which
each of $B_1$ and $B_2$, independently, is a radical of formula (a') and $A_x$ is as defined above. Preferably, in the groups of formula $A_x$, $Q_1$ is hydrogen when $Q_2$ is $-SO_2NR_1R_2$.

Of the complexes of formula I', the complexes wherein each $A_x$, independently, is $A_x'$ are more preferred, with those wherein $B_1$ and $B_2$ are 2,4-diaminophenyl being even more preferred. Of the complexes of these two groups, those wherein any $-SO_2NR_1'R_2'$ as $Q_2$ is $-SO_2NHR_2''$ are even more preferred.

Of the complexes of formulae I and I', the symmetrical complexes are preferred, especially those wherein $B_1$ and $B_2$ are 2,4-diaminophenyl.

When the complexes of formula I are in salt form the cations of the salt form of the acid groups may be any of those which are common for anionic metallic complexes. Preferred cations are alkali metal cations, especially sodium, lithium or potassium, unsubstituted ammonium, ($C_{1-4}$), preferably ($C_{1-2}$), alkyl-substituted ammonium or hydroxy($C_{2-4}$) preferably ($C_{2-3}$)substituted-ammonium. The unsubstituted, lower alkyl substituted and hydroxyalkyl substituted ammonium cations may be represented by the formula $-N^\oplus(R_x)_4$, where each $R_x$ is, independently, hydrogen, ($C_{1-4}$)alkyl or 2-, 3- or 4-hydroxy($C_{2-4}$)alkyl, with the proviso that when any $R_x$ is hydroxyalkyl at least one other $R_x$ is hydrogen. Examples of such cations are ammonium, triethylammonium, mono-, di- and triethanolammonium and mono-, di- and triisopropanolammonium.

By "salt form" is intended those complexes wherein all or part of the sulpho groups are in salt form and optionally any carboxyl groups present are in salt form. It will be appreciated that when the complexes of the present invention are in salt form, the protons compensating the negative charge of the chromium may, to a greater or lesser extent, depending on the conditions employed, be replaced by the cations of the salt form of the acid groups.

Preferably, the complexes of formula I are in salt form.

The present invention also provides a process for the production of complexes of formula I comprising coupling the bisdiazo derivative of a complex of formula II,

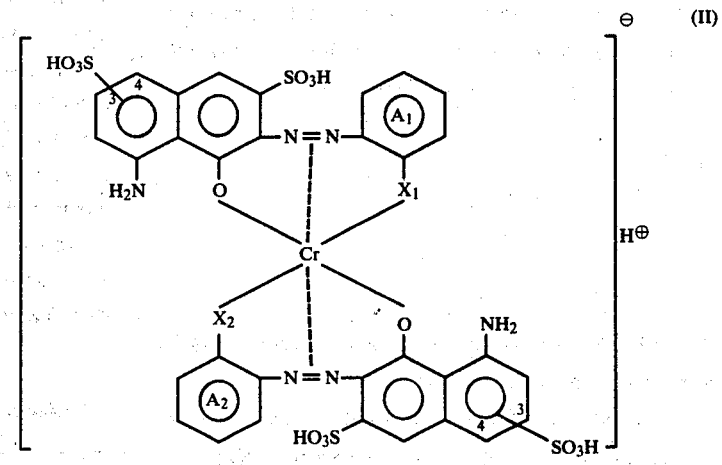

which complex is in free acid or salt form, or a mixture of complexes of formula II, with a coupling component H-$B_1$, or a mixture thereof, and with a coupling component H-$B_2$, or a mixture thereof.

The complexes of formula II may be produced by treating the compounds of formulae V and VI, or mixtures of those compounds,

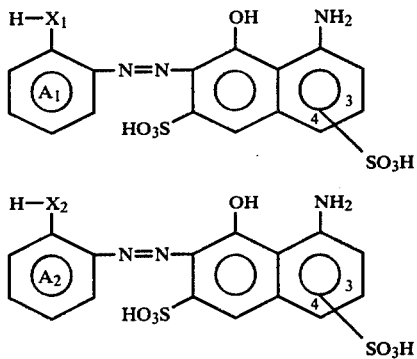

with a chromium-donating compound in accordance with known methods.

Metallization may be carried out in accordance with conventional methods, either by first forming a 1:1 complex of a compound of formula V or VI and reacting the same with a compound of formula VI or V, respectively, or by simultaneously metallizing the compounds of formulae V and VI.

Diazotization and coupling may be carried out in accordance with known methods. Coupling is preferably carried out in a medium having a pH of from 4 to 13. The complexes of formula I may be isolated in conventional manner.

The compounds of formulae V and VI are either known or may be prepared from available starting materials in accordance with known methods, for example by diazotizing a compound of the formula

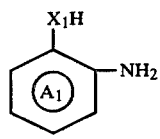

and coupling with 1-amino-8-hydroxynaphthalene-3- or 4-,6-disulphonic acid or a salt thereof.

The complexes of formula I and the mixtures thereof are useful for dyeing or printing substrates dyeable with anionic dyestuffs. Preferred substrates are those which consist of or comprise natural or regenerated cellulose, natural or synthetic polymides, leather, polyurethanes and basically modified polymers such as, for example, basically modified polypropylene, which substrates may be in the form of fibres, filaments, yarns, wovens, felts, fleeces, carpets, halffinished or finished goods. More preferred substrates are synthetic polyamides, wool and especially leather. The leather may be tanned in the usual manner, e.g. naturally, synthetically and/or chrome tanned. Dyeing or printing may be carried out in accordance with known methods for example, by exhaust dyeing, pad dyeing or printing. The dyestuff may be employed in concentrations up to the saturation point of the substrate, for example, 0.001 to 1% or 0.01 to 5% pure dyestuff.

The complexes of formula I and the mixtures thereof may be employed as such or may be used in the form of liquid or solid preparations which are obtained in accordance with known methods by combining the dyestuff with blending agents and other conventional additives.

The grey dyes of the present invention have good build-up on leather of low affinity and give even dyeings on leather having good fastnesses, especially light fastness. Also to be mentioned are rubbing fastness and fastness to perspiration, water and dry-cleaning.

The following Examples further serve to illustrate the invention. In the Examples all parts and percentages are by weight and the temperatures are in degrees Centigrade.

EXAMPLE 1

199 parts of 2-amino-4,6-dinitro-1-hydroxybenzene are diazotised in the usual manner with hydrochloric acid and sodium nitrite and are coupled at a pH of 7–9 with 319 parts of 1-amino-8-hydroxynaphthalene-3,6-disulphonic acid. The monoazo compound thus obtained is heated to 100° C. and then 120 parts of chromium acetate are added. The mixture is boiled at 100° C. (about 2–4 hours) until the monoazo compound has completely reacted to form the 1:2 chromium complex. The 1:2 chromium complex is subsequently diazotised in the usual manner with hydrochloric acid and sodium nitrite and coupled at a pH of 9–13 with 145 parts of 8-hydroxyquinoline. The dyestuff obtained is precipitated with common salt. It is a black powder which dyes leather in grey shades.

EXAMPLE 2

Following the procedure of Example 1, but employing, instead of the 145 parts of 8-hydroxyquinoline, 108 parts of m-diaminobenzene and coupling at a pH of 5–9, a dyestuff, which is a black powder and dyes leather in grey shades, is obtained.

In the above Examples 1 and 2 the alkaline pH for the coupling is obtained by employing lithium, sodium, potassium or ammonium hydroxide and thus, the dyestuffs are obtained in the corresponding salt forms.

The following table contains further Examples of dyestuffs according to the invention. These dyestuffs in the free acid form correspond to the general formula

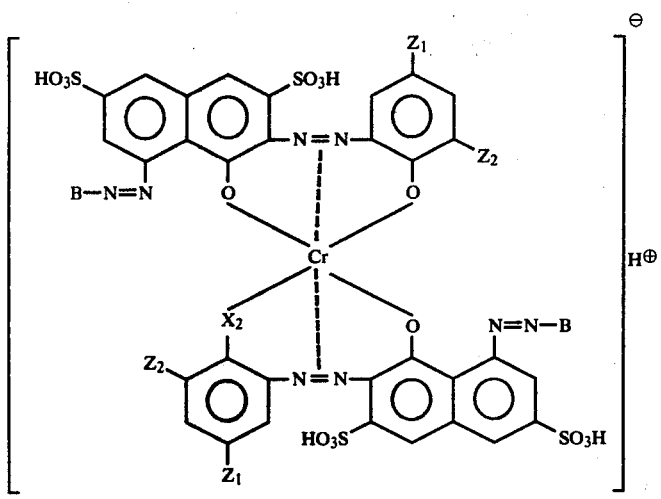

and may be produced in analogy with the procedure described in Examples 1 and 2.

Table

| Example No. | $Z_1$ | $Z_2$ | —B | Shade of dyeing on leather |
|---|---|---|---|---|
| 3 | $NO_2$ | —$NO_2$ | ⟨C₆H₄⟩—OH (4-hydroxyphenyl) | bluish-grey |
| 4 | $NO_2$ | —$NO_2$ | 2-hydroxy-5-methylphenyl | " |
| 5 | —$NO_2$ | —$NO_2$ | 3,5-diamino-4-methylphenyl (NH₂, NH₂, CH₃) | greenish-grey |
| 6 | —$SO_2NH\cdot CH_3$ | H | 8-hydroxy-5-methylquinolin-yl | neutral grey |
| 7 | " | " | 3,5-diamino-4-methylphenyl | " |
| 8 | —$SO_2$—NH—C₆H₅ | " | 8-hydroxy-5-methylquinolin-yl | " |

Table-continued
| Example No. | $Z_1$ | $Z_2$ | —B | Shade of dyeing on leather |
|---|---|---|---|---|
| 9 | " | " | 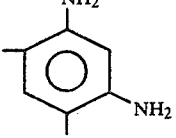 | " |
| 10 | " | " | 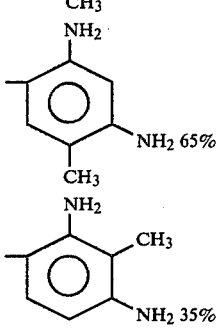 65%  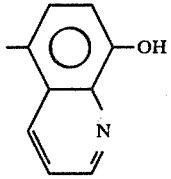 35% | " |
| 11 | —NO$_2$ | H | 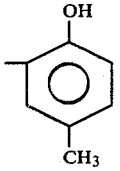 | grey |
| 12 | " | " | 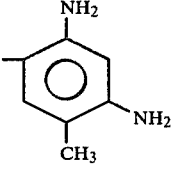 | bluish-grey |
| 13 | " | " | 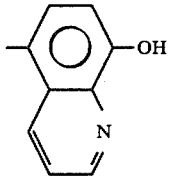 | greenish-grey |
| 14 | Cl | " | 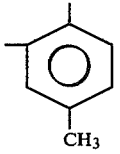 | neutral grey |
| 15 | " | " | 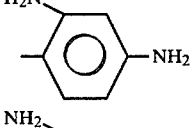 | bluish-grey |
| 16 | —NO$_2$ | " | 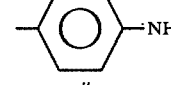 | greenish grey |
| 17 | Cl | H | 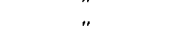 | greenish-grey |
| 18 | Cl | NO$_2$ | " | " |
| 19 | —SO$_2$—NH—CH$_3$ | H | " | neutral grey |

Table-continued

| Example No. | $Z_1$ | $Z_2$ | —B | Shade of dyeing on leather |
|---|---|---|---|---|
| 20 | —SO$_2$—NH—⟨phenyl⟩ | H | " | " |
| 21 | —SO$_2$—NH—⟨phenyl-COOH⟩ | H | " | " |
| 22 | —SO$_2$NH$_2$ | H | " | " |

Application Example A 100 parts of newly tanned and neutralised chromium grain leather are milled for 30 minutes in a dye vessel in a liquor consisting of 250 parts of water at 55° and 0.5 parts of the dyestuff of Example 1; the leather is then treated in the same bath for a further 30 minutes with 2 parts of an anionic fat-liquor based on sulphonated train oil. The leather is dried and finished in the usual manner. An even dyeing in a grey shade is obtained.

Application Example B 100 parts of calf suede are milled in a dye vessel for 4 hours with 1000 parts of water and 2 parts of ammonia and are subsequently dyed for 1½ hours in a further bath containing: 500 parts of water at 55°, 2 parts of ammonia, 5 parts of dissolved dyestuff of Example 1. In order to exhaust the dyebath, 4 parts of formic acid (85%) are slowly added and dyeing continues until the dyestuff has been completely fixed. After buffing the suede side, the suede leather which is rinsed, dried and finished in the usual manner is evenly dyed in a grey shade.

Application Example C 100 parts of chromium-vegetable tanned lamb's leather and 5 parts of the dyestuff of Example 1 are milled for 45 minutes in a dye vessel, in a liquor consisting of 1000 parts of water at 55° and 1.5 parts of an anionic sperm oil emulsion, and the dyestuff is fixed on the leather by slowly adding 5 parts of formic acid (85%) over the course of 30 minutes. After the usual drying and finishing processes, an even dyeing of a grey shade is obtained.

Application Example D

A solution of 20 parts of the dyestuff of Example 1 in 847 parts of water, 150 parts of ethyl glycol and 3 parts of formic acid (85%) is applied by spraying, plushing and pouring to the grain side of a buffed, combined-tanned cow-hide.

The leather is dried and finished under mild conditions. A dyeing of a grey shade with good fastnesses is obtained.

In analogous manner to the procedure described in the above Examples A-D, the dyestuffs of Examples 2-22 may be used, whereby even dyeings of shades indicated in the Table are obtained.

What is claimed is:

1. A complex of the formula

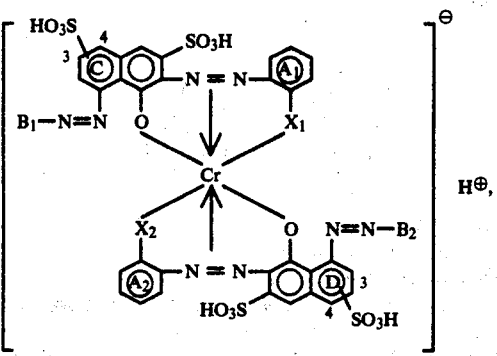

or a salt thereof,
or a mixture of such complexes in free acid or salt form,
wherein
each of

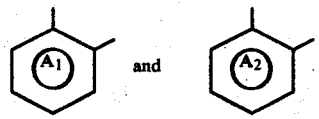

is independently the radical of a diazo component of the benzene series, with the proviso that rings $A_1$ and $A_2$ are free from acid groups bound directly thereto and free from fiber-reactive groups, each of $B_1$ and $B_2$ is independently 8-hydroxyquinolyl or substituted phenyl having (i) one or two substituents each of which is independently hydroxy, —NH$_2$, anilino or (C$_{1-4}$alkyl)phenylamino, with the proviso that not more than one substituent is selected from anilino and (C$_{1-4}$alkyl)phenylamino, and (ii) a maximum of one substituent selected from the group consisting of C$_{1-4}$alkyl, C$_{1-4}$alkoxy and halo, each of $X_1$ and $X_2$ is independently —O— or —COO—, and each of the sulfo groups on rings C and D is independently in the 3- or 4-position, wherein each halo is independently fluoro, chloro, bromo or iodo.

2. A complex according to claim 1, or a salt thereof, or a mixture of such complexes in free acid or salt form, wherein each of rings $A_1$ and $A_2$ is independently further unsubstituted or further substituted by one or two substituents each of which is independently halo, nitro, C$_{1-4}$alkyl, C$_{1-4}$alkoxy or —SO$_2$NR$_1$R$_2$, with the proviso that the maximum number of —SO$_2$NR$_1$R$_2$ substituents is one,
wherein
R$_1$ is hydrogen or C$_{1-4}$alkyl, and
R$_2$ is hydrogen, C$_{1-4}$alkyl or

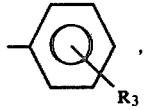

wherein R$_3$ is hydrogen, halo, C$_{1-4}$alkyl, C$_{1-4}$alkoxy or carboxy.

3. A complex according to claim 2, or a salt thereof, or a mixture of such complexes in free acid or salt form, wherein

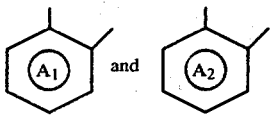

are identical,
B$_1$ and B$_2$ are identical,
X$_1$ and X$_2$ are identical, and
the sulfo groups on rings C and D are both in the 3-position or both in the 4-position.

4. A complex according to claim 2, or a salt thereof, or a mixture of such complexes in free acid or salt form, wherein each of B$_1$ and B$_2$ is independently substituted phenyl having (i) one or two substituents each of which is independently hydroxy, —NH$_2$, anilino or (C$_{1-4}$alkyl)phenylamino, with the proviso that not more than one substituent is selected from anilino and (C$_{1-4}$alkyl)-phenylamino, and (ii) a maximum of one substituent selected from the group consisting of C$_{1-4}$alkyl, C$_{1-4}$alkoxy and halo.

5. A complex according to claim 2, or a salt thereof, or a mixture of such complexes in free acid or salt form, wherein
R$_1$ is hydrogen or methyl, and
R$_2$ is hydrogen, methyl or

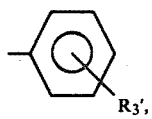

wherein R$_3'$ is hydrogen, chloro, methyl, methoxy or carboxy.

6. A complex according to claim 2, or a salt thereof, or a mixture of such complexes in free acid or salt form, wherein each of

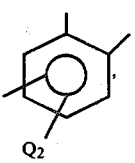 is independently wherein
Q$_1$ is hydrogen or nitro, and
Q$_2$ is hydrogen, chloro, nitro or —SO$_2$NR$_1$R$_2$,
wherein
R$_1$ is hydrogen or C$_{1-4}$alkyl, and
R$_2$ is hydrogen, C$_{1-4}$alkyl or

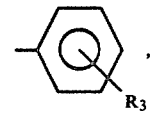

wherein
R$_3$ is hydrogen, halo, C$_{1-4}$alkyl, C$_{1-4}$alkoxy or carboxy, with the proviso that Q$_1$ must be hydrogen when Q$_2$ is —SO$_2$NR$_1$R$_2$.

7. A complex according to claim 2, or a salt thereof, or a mixture of such complexes in free acid or salt form, wherein each of B$_1$ and B$_2$ is independently 8-hydroxyquinolyl or substituted phenyl having (i) one or two substituents each of which is independently —NH$_2$ or hydroxy, with the proviso that not more than one substituent is hydroxy, and (ii) a maximum of one substituent selected from the group consisting of C$_{1-4}$alkyl, C$_{1-4}$alkoxy and halo.

8. A complex according to claim 2, or a salt thereof, or a mixture of such complexes in free acid or salt form, wherein each of B$_1$ and B$_2$ is independently

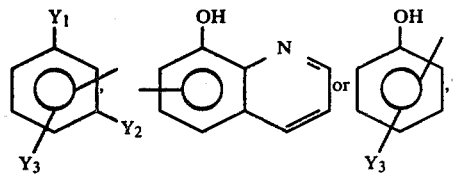

wherein
Y$_1$ is —NH$_2$ or hydroxy,
Y$_2$ is —NH$_2$, anilino or (C$_{1-4}$alkyl)-phenylamino, and
Y$_3$ is hydrogen, C$_{1-4}$alkyl, C$_{1-4}$alkoxy or chloro, with the proviso that when Y$_3$ is C$_{1-4}$alkyl, C$_{1-4}$alkoxy or chloro and is attached to a ring having a Y$_1$ substituent, it is ortho or para to Y$_1$.

9. A complex according to claim 8, or a salt thereof, or a mixture of such complexes in free acid or salt form, wherein each of B$_1$ and B$_2$ is independently

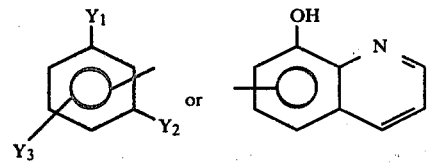

10. A complex according to claim 9, or a salt thereof, or a mixture of such complexes in free acid or salt form, wherein each of B$_1$ and B$_2$ is independently

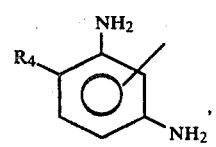

wherein R$_4$ is hydrogen or methyl.

11. A complex according to claim 8, or a salt thereof, or a mixture of such complexes in free acid or salt form, wherein
X₁ is —O—, and
X₂ is —O—.

12. A complex according to claim 11 having the formula

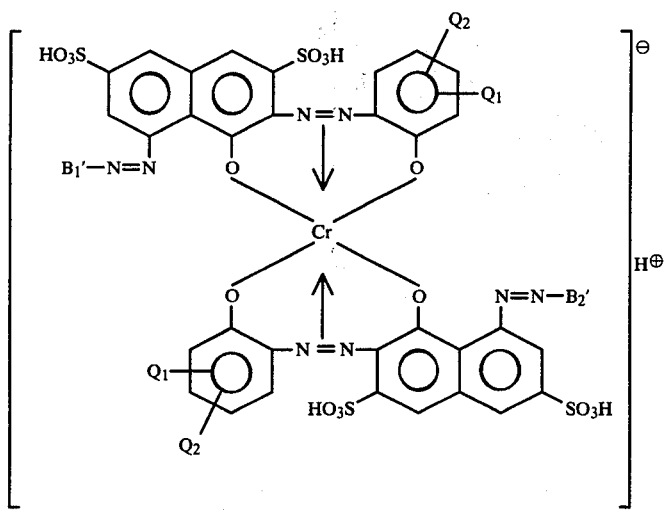

or a salt thereof,
or a mixture of such complexes in free acid or salt form,
wherein each of B₁' and B₂' is independently

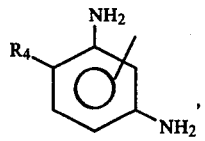

wherein R₄ is hydrogen or methyl, each Q₁ is independently hydrogen or nitro, and each Q₂ is independently hydrogen, chloro, nitro or —SO₂NR₁R₂,
wherein
R₁ is hydrogen or $C_{1-4}$alkyl, and
R₂ is hydrogen, $C_{1-4}$alkyl

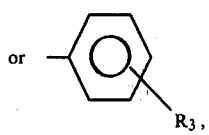

wherein R₃ is hydrogen, halo, $C_{1-4}$alkyl, $C_{1-4}$alkoxy or carboxy,
with the proviso that Q₁ must be hydrogen when Q₂ is —SO₂NR₁R₂,
wherein each halo is independently fluoro, chloro, bromo or iodo.

13. A complex according to claim 12, or a salt thereof,
or a mixture of such complexes in free acid or salt form, wherein each Q₂ is independently chloro, nitro or —SO₂NR₁'R₂',
wherein R₁' is hydrogen or methyl, and
R₂' is hydrogen, methyl or

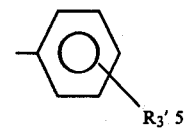

wherein R₃' is hydrogen, methyl, methoxy, chloro or carboxy.

14. A complex according to claim 13, or a salt thereof,
or a mixture of such complexes in free acid or salt form, wherein
R₁' is hydrogen, and
R₂' is methyl, phenyl or carboxyphenyl.

15. A complex according to claim 14, or a salt thereof,
or a mixture of such complexes in free acid or salt form, wherein
B₁' is 2,4-diaminophenyl, and
B₂' is 2,4-diaminophenyl.

16. A complex according to claim 12, or a salt thereof,
or a mixture of such complexes in free acid or salt form, wherein
B₁' and B₂' are identical, and the two

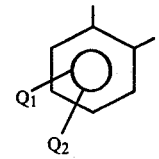

radicals are identical.

17. The complex according to claim 16 having the formula

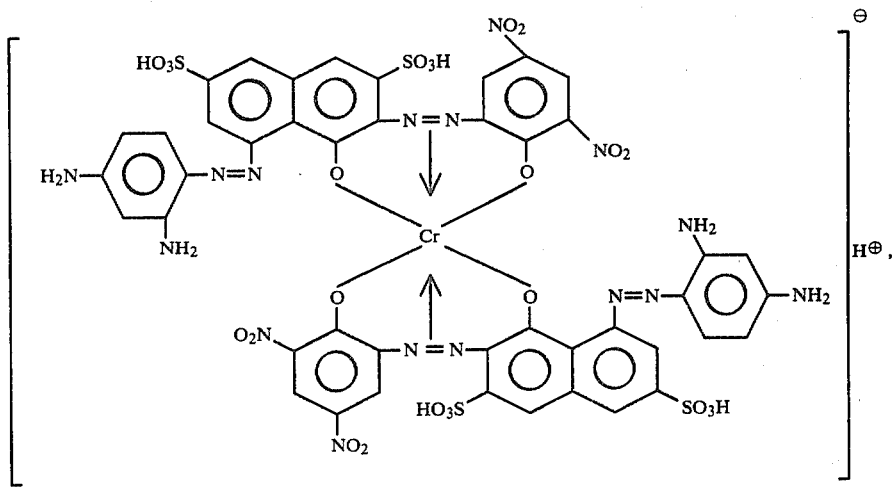
or a salt thereof.
18. The complex according to claim 16 having the formula
19. The complex according to claim 16 having the formula
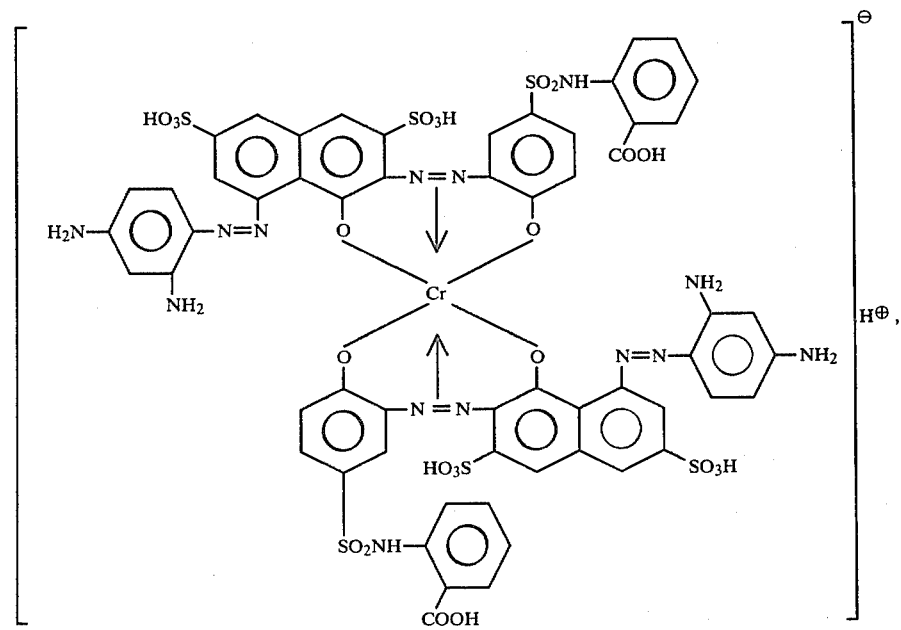
or a salt thereof.

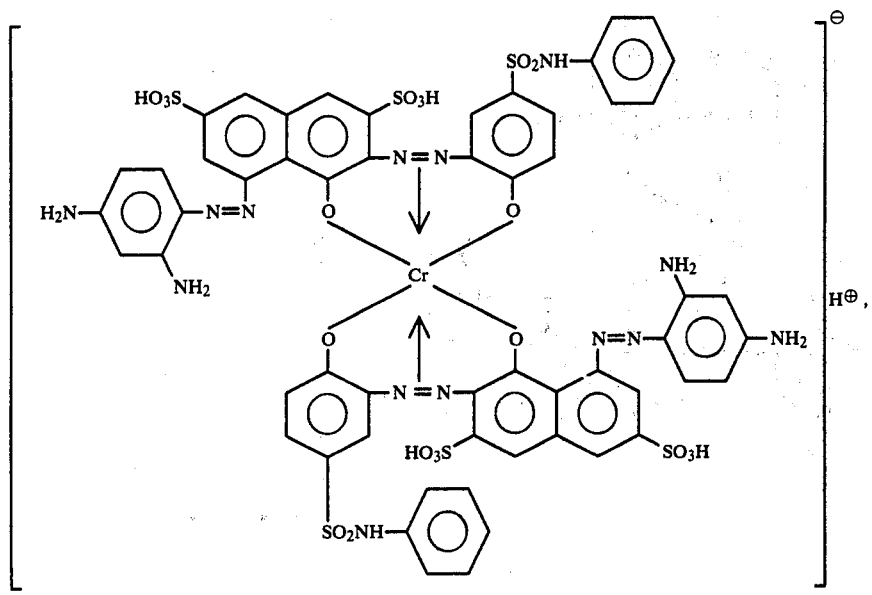
or a salt thereof.
20. The complex according to claim 16 having the formula
or a salt thereof.
21. The complex according to claim 16 having the formula
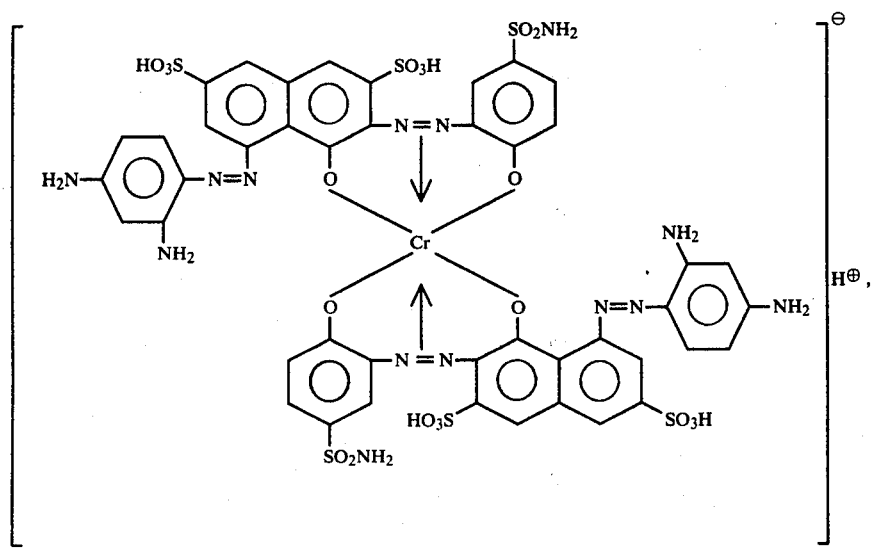

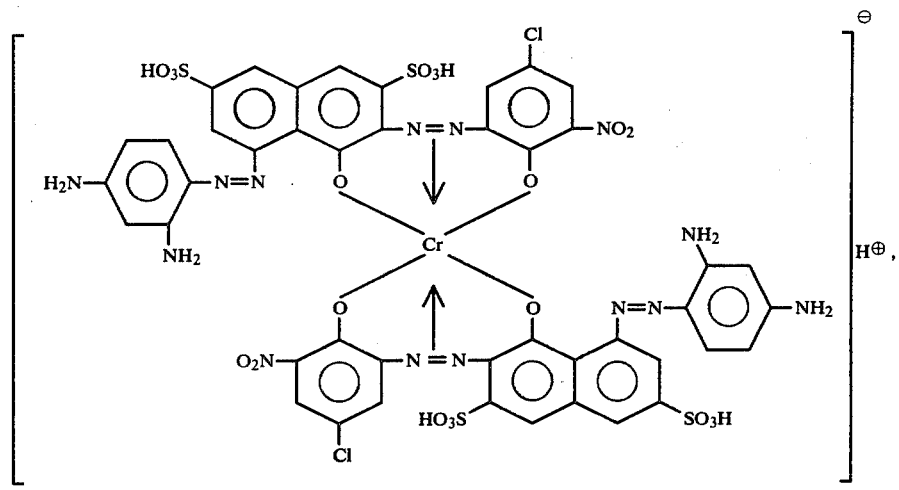
or a salt thereof.
* * * * *